Patented Dec. 4, 1951

2,577,060

UNITED STATES PATENT OFFICE 2,577,060

ABRASIVE ARTICLE

Charles E. Wooddell, Garret Van Nimwegen, and Edward T. Hager, Niagara Falls, N. Y., assignors to The Carborundum Company, Niagara Falls, N. Y., a corporation of Delaware No Drawing. Application August 12, 1947, Serial No. 768,282

10 Claims. (Cl. 51—299)

This invention relates to improved abrasive articles wherein the abrasive grains are bonded with a copolymer of a conjugated diolefin with an unsaturated ketone.

This application is a continuation-in-part of our copending application Serial No. 438,814 filed April 13, 1942 and now abandoned.

While rubber-bonded abrasive articles have many desirable properties and can be manufactured in comparatively short periods of time, it is difficult to obtain natural rubber of consistent quality from time to time. Natural rubber is obtained from many species of plants such as *Hevea brasiliensis, Castilloa elastica,* Manihot, the guayule species, etc. Commercial rubber obtained from such different species by various methods is a somewhat indefinite mixture of resins, rubber hydrocarbon and proteins. The general formula for the rubber hydrocarbon is $(C_5H_8)_n$, where $n$ represents the degree of polymerization. The properties of commercial rubber vary with the source of the rubber latex, with the methods used to coagulate the latex, and with the methods used to remove undesirable resins and proteins from the rubber mass.

A great deal of research has been undertaken with the object of using a synthetic polymerization product which might be vulcanizable and have the desirable properties of natural vulcanized rubber and fewer of its disadvantages in the making of bonded abrasive wheels. It has been suggested for example that a synthetic polymer known briefly as "chloroprene" should be used in the manufacture of abrasive articles. "Chloroprene" or 2-chlorobutadiene can be readily polymerized. By interrupting the process of polymerization before completion, an alpha polymer of chloroprene is obtained which is soft, plastic and soluble in benzene. The product resembles unvulcanized rubber in its physical properties and mechanical behavior. At 130° C. the alpha polymer changes into an elastic polymer in a few minutes. Catalysts such as zinc oxide accelerate this change to the elastic chloroprene. Sulphur is not necessary to bring about this change. By suitably compounding and curing chloroprene, vulcanizates can be obtained with tensile strengths of over 3000 pounds per square inch. Elongations at the breaking point are obtained of the order of 700 to 900 per cent. Efforts have been made to obtain a vulcanizate similar to hard rubber. This does not appear to be possible by the polymerization of chloroprene. These properties of polymerized chloroprene greatly limit its usefulness as a bond for abrasive articles. With elongations of the order of magnitude of 700 to 900 per cent, abrasive grain cannot be held securely enough by a chloroprene bond to make grinding wheels for processing hard materials.

In accordance with the present invention we use as a bond for abrasive articles a synthetic polymerization product which is vulcanizable to a state or condition similar to that of a vulcanized hard rubber or ebonite. Such vulcanizable polymerization products are obtained by copolymerizing a conjugated diolefin such as butadiene, or one of its homologs or substitution products, all of which are herein referred to as "monomers of the butadiene type," in admixture with one or more secondary monomers that will copolymerize therewith, the secondary polymerizing component functioning as a hardening monomer whereby the final polymerized, hard vulcanized bond is obtained. The bond of the present invention is the vulcanized copolymerization product obtained after blending or compounding of the previously polymerized copolymer with the necessary vulcanizers, accelerators, fillers, activators, etc., and vulcanization therewith, the copolymer being a polymerized product comprising (1) one or more monomers of the butadiene type, and (2) an unsaturated ketone.

Monomers of the butadiene type are characterized by the presence within the monomer of two unsaturated bonds in conjugated position. The existence of the two points of unsaturation makes it possible to more readily produce a polymerized form of the substance with itself and other monomers, and at the same time leave sufficient remaining points of unsaturation to permit vulcanization and provide a source of cross-linkage and interaction with the various other constituents of the mixture, thereby obtaining an ultimate bond of high strength, hardness and durability.

For example, butadiene monomer has the formula $CH_2=CH—CH=CH_2$, in which there are two double bonds, one between the first and second carbon atoms of the chain and the second double bond between the third and fourth carbon atoms of the chain. These double bonds are points of unsaturation, in other words, they are points in the molecule where other butadiene molecules or other chemical molecules may attach themselves or interact with the butadiene molecules to form a more complex, but modified substance. The above monomeric butadiene is considered for purposes of the polymerization reaction to take the formula form as follows:

$$(—CH_2—CH=CH—CH_2—)$$

which, as can be seen provides two free available valences, one at each end of the monomer. Large numbers of these monomer molecules in the polymerizing reaction unite end to end through these free terminal valences to provide a long chain polymer of great length. However, from examination of the molecule structure above it is apparent that there still remains within the polymerized substance double bonds, or points of unsaturation, at which the polymer can link itself to other modifying constituents or by means of vulcanization agents form cross-linkages to form hard vulcanizates.

Conjugated diolefins or monomers of the butadiene type which can be used include butadiene-1,3 and its homologs or substitution products. Specific diolefins are butadiene-1,3, the methyl butadienes including 1-methylbutadiene-1,3, 2-methylbutadiene-1,3 (isoprene), the dimethyl butadienes including 2,3-dimethylbutadiene-1,3 (methyl isoprene) and 1,4-dimethylbutadiene-1,3, 2,3-diphenylbutadiene-1,3, 1-vinylbutadiene-1,3, 1-cyanobutadiene-1,3, 2-cyanobutadiene-1,3, pentadiene-1,3 (piperylene), hexadiene-1,5 (diallyl). For some purposes we may use compounds of similar composition such as divinyl ether and vinyl acetylene in place of part or all of the diolefin.

Unsaturated ketones which we use to copolymerize with the monomers of the butadiene type are characterized by the presence of a double bond. By reason of that unsaturation in the ketone, chains normally formed by polymerizing the butadiene type monomers may be crosslinked, as a result of which the copolymers have a three-dimensional structure. Where the unsaturated ketone is used in relatively small proportions so that there is not enough of the ketone present to satisfy all of the double bonds of the chain of the butadiene type polymer the copolymers are vulcanizable with sulphur or other vulcanizing agents. On the other hand, if a sufficient amount of the unsaturated ketone is included to completely satisfy the double bonds of the diolefins the copolymer may be rigidified by the action of the unsaturated ketone or other hardening monomer where such is included.

We have at times found it desirable to modify the hardness characteristics of the vulcanized copolymerization products by making a three-component copolymer or interpolymer, the third monomer which is introduced being of a character to soften or plasticize the final product to make it somewhat more flexible or elastic. Monomeric substances for this purpose include propene, butene and isobutene.

The unsaturated ketones which we use to copolymerize with the butadiene type compound respond to the general formula $C_nH_{2n-2}$. We prefer to use such ketones where $n$ is from 5 to 7 and H is from 8 to 12. Specific examples of the ketones which we use are methyl, ethyl, propyl and isobutyl-vinyl ketones, methyl, ethyl and propyl-allyl ketones, methyl or ethyl propenyl ketone, methyl isopropenyl ketone, and allyl acetone and methyl methylene ethyl ketone.

Methods of making copolymers of our invention are well known and therefore need not be specifically described. Generally speaking, the copolymers are made by heating emulsions of the reactants in the presence of catalysts, frequently under pressure, whereupon an emulsion of the copolymer is obtained. The emulsion may be employed directly in the manufacture of the abrasive articles but more frequently is coagulated to provide the polymer as a solid which is rolled into sheet form.

The proportion of the butadiene type monomer to the unsaturated ketone may be varied through a considerable range and as indicated, mixtures of different butadiene type compounds and/or different ketones may be interpolymerized. We usually prefer to use from about 50 to 90% of the conjugated diolefin to 10 to 50% of the ketone or other unsaturated monomer. Where relatively large proportions of the butadiene type compound are used the copolymers are vulcanizable to a condition resembling soft rubber if a relatively small amount of vulcanizing agent is used or they may be made to resemble ebonite by employing larger amounts of the vulcanizing agent, as for example up to 50% of sulfur based on the weight of the copolymer. Most abrasive articles are formed with the bonds vulcanized to the rigid or ebonite condition although there is some small use for articles having an elastic bond.

Where the bonds are used in the form of the emulsions they may be admixed with the abrasive grains and with the filling and vulcanizing materials and broken to deposit the copolymer from the emulsion. A more common practice is to employ the copolymers in sheet form in which case the sheet is plasticized as by milling and by adding softeners or plasticizers. A desired softener may be the ester type such as dibutoxyethyl phthalate, dibutyl phthalate or tricresylphosphate or it may be one of the soft coal tar products or a coumarone-indene resin. A combination of different softeners is often advisable. After the copolymer has been masticated to a plastic mass, it is mixed with sulphur or other hardening agent such as zinc oxide or magnesium oxide, a filler (or reinforcer) such as hard rubber dust, gypsum or cryolite, vulcanizing accelerators, antioxidants, plasticizers, or other activating or protective ingredients which may be required. This bonding mixture is then admixed with abrasive particles in the desired proportions. The abrasive mix is made by any suitable means at a temperature sufficiently low to retard further polymerization and is then transferred to molds. The molded articles can be cured at temperatures of about 340° F. in 90–120 minutes.

The synthetic copolymer emulsion may also be used directly by coagulation on the abrasive particles together with the sulphur or other hardening agent, fillers, vulcanizing accelerators, antioxidants, plasticizers, or other activating or protective ingredients which may be required. The residual moisture is removed by drying and the mix then transferred to molds. The molded articles can be cured at temperatures of about 340° F. in 90–120 minutes.

The proportion of copolymer used in the abrasive mix may be from about 6–15% by weight and the abrasive grain may be present in the proportion of about 70–90% by weight. The grinding characteristics may be varied by changing the amount of total bond, the amount and kind of copolymer used, and by using modifying agents such as fillers and heat-hardenable phenolic resins. We frequently use a heat-hardenable phenol-formaldehyde condensation product in the "A" stage, either as a liquid or as a powder or sometimes in both states. The liquid resins exert a slight plasticizing effect on the copolymer and where they are used the amount of conventional plasticizer may be reduced accordingly. These resins also act to increase the tensile strength and heat-resistance of the bond.

The bond is prepared before any abrasive grain is incorporated in the mix. The mixing operation is carried out on a pair of ordinary rubber rolls. The butadiene-acrylic nitrile copolymer is passed through the cool rolls three or four times and then allowed to run around the front roll during the breaking down period. The accelerator is added with cutting and blending. The softener or plasticizer and any liquid phenolic resin, followed by the zinc oxide and filler, are incorporated slowly with further working of the mix. Where sulphur and/or powdered resins are used they are the last ingredient added and are introduced without cutting. After thorough mixing the batch is cut each way several times before removing it from the rolls.

The rolls are made slightly warm and the bond mixture is passed through the rolls to make it more plastic before the addition of abrasive. The abrasive is added to the mix in small amounts in the manner employed in making natural rubber bonded abrasives. When all the abrasive has been added the abrasive-bond mixture is sheeted to the desired thickness and finally died out in the required shape before vulcanization. The wheels are cured two hours at 80 pounds steam and 500 pounds per square inch pressure in a mold and later finally vulcanized 16 hours at 300° F. in an oven.

Our invention makes it possible to prepare abrasive articles having widely differing grinding characteristics by varying the properties of the copolymer. Generally speaking, an increase in the proportion of the conjugated diolefin results in a copolymer which will react with more sulphur or other hardening agent and form a correspondingly more rigid vulcanizate. By reason of this fact it is possible to vary the properties of the copolymer through a very considerable range. Still more variation in the properties of the copolymers can be obtained by employing three-component interpolymers.

While the copolymers, suitably modified by fillers and the like, are of themselves satisfactory bonds for many purposes, we have at times found it advantageous to admix them with natural rubber. Our invention therefore contemplates the preparation of abrasive articles in which the bond contains both natural rubber and one or more of the copolymers as well as mixtures of various copolymers. The proportion of the natural and synthetic materials may be varied widely, depending upon the properties desired in the completed abrasive article.

While in general we prefer to vulcanize the bonds of our invention to an extent sufficient to convert the bond to a condition similar to that found in hard rubber or ebonite, for certain purposes we prefer to employ the bond in a more rubbery condition. This is accomplished by selecting a copolymer which contains a relatively large amount of a conjugated diene and by using lesser amounts of vulcanizing agents. In some instances the bonds have been found to be satisfactory without vulcanization with sulphur or other vulcanizing agent, particularly where relatively large proportions of the unsaturated ketone are employed in making the copolymer.

An advantage of the invention is that synthetic polymerization products can be obtained according to specification as materials of more definite properties than commercial natural rubber which as noted earlier contains different percentages of resins and proteins, which are difficult to separate completely from the rubber hydrocarbon. Of extreme importance to the invention is the fact that the polymerization products herein used are capable of vulcanization to various stages of resiliency and hardness, even to the substantially rigid condition of hard rubber or ebonite.

Generally speaking, the vulcanizates herein referred to are characterized by a higher thermal conductivity than natural rubber, especially good heat resistance and an ability to resist deterioration by numerous oils and hydrocarbons, which are often used in wet grinding operations.

A number of changes can be made in the manufacture of abrasive articles and in the choice of polymerization products and modifying ingredients from the specific example which has been described by way of example without departing from the invention which is defined within the compass of the following claims.

We claim:

1. An abrasive article comprising about 70–90% by weight of abrasive grains and a bond for the grains comprising about 6–15% by weight of the abrasive article of a copolymer of about 50–90% of a compound selected from the group consisting of conjugated diolefins containing from 4 to 6 carbon atoms and the methyl, phenyl, vinyl and cyano substitution products thereof with 50–10% of an unsaturated ketone having the general formula $C_nH_{2n-2}O$ where $n$ is a whole number from 4 to 7, said copolymer being sulphur-vulcanized to a hard rubber condition.

2. An article as claimed in claim 1 wherein the unsaturated ketone is methyl vinyl ketone.

3. An article as claimed in claim 1 wherein the unsaturated ketone is methyl isopropenyl ketone.

4. An article as claimed in claim 1 wherein the unsaturated ketone is methyl methylene ethyl ketone.

5. An abrasive article comprising about 70–90% by weight of abrasive grains and a bond for the grains comprising about 6–15% by weight of the abrasive article of a copolymer of about 50–90% of butadiene with 50–10% of an unsaturated ketone having the general formula $C_nH_{2n-2}O$ where $n$ is a whole number from 4 to 7, said copolymer being sulphur-vulcanized to a hard rubber condition.

6. An article as claimed in claim 5 wherein the unsaturated ketone is methyl vinyl ketone.

7. An article as claimed in claim 5 wherein the unsaturated ketone is methyl isopropenyl ketone.

8. An article as claimed in claim 5 wherein the unsaturated ketone is methyl methylene ethyl ketone.

9. An article as claimed in claim 1 wherein the substituted diolefin is a methyl-substituted butadiene-1,3.

10. An article as claimed in claim 1 wherein the substituted diolefin is 2,3-dimethyl butadiene-1,3.

CHARLES E. WOODDELL.
GARRET VAN NIMWEGEN.
EDWARD T. HAGER.

REFERENCES CITED

The following references are of record in the file of this patent:

UNITED STATES PATENTS

| Number | Name | Date |
|---|---|---|
| Re. 1,288 | Mayall | Mar. 18, 1862 |
| 2,194,350 | Berg | Mar. 19, 1940 |
| 2,229,880 | Allison | Jan. 28, 1941 |
| 2,281,613 | Wollthan et al. | May 5, 1942 |
| 2,384,683 | Kistler | Sept. 11, 1945 |